United States Patent
Kourtakis et al.

(10) Patent No.: US 11,248,143 B2
(45) Date of Patent: Feb. 15, 2022

(54) COATED FILMS AND ELECTRONIC DEVICES

(71) Applicant: DUPONT ELECTRONICS, INC., Wilmington, DE (US)

(72) Inventors: Kostantinos Kourtakis, Media, PA (US); Tao Huang, Downingtown, PA (US)

(73) Assignee: DUPONT ELECTRONICS, INC., Wilmington, DE (US)

(*) Notice: Subject to any disclaimer, the term of this patent is extended or adjusted under 35 U.S.C. 154(b) by 86 days.

(21) Appl. No.: 16/880,296

(22) Filed: May 21, 2020

(65) Prior Publication Data

US 2020/0369913 A1  Nov. 26, 2020

Related U.S. Application Data

(60) Provisional application No. 62/852,953, filed on May 24, 2019.

(51) Int. Cl.
| | | |
|---|---|---|
| *C09D 177/10* | (2006.01) | |
| *C09D 183/04* | (2006.01) | |
| *C08K 3/36* | (2006.01) | |

(52) U.S. Cl.
CPC ......... *C09D 177/10* (2013.01); *C09D 183/04* (2013.01); *C08K 3/36* (2013.01); *C08K 2201/011* (2013.01)

(58) Field of Classification Search
CPC  C09D 177/10; C09D 183/04; C08G 73/1067; C08K 3/36; C08K 2003/2244
See application file for complete search history.

(56) References Cited

U.S. PATENT DOCUMENTS

| | | | |
|---|---|---|---|
| 5,166,308 A | | 11/1992 | Kreuz et al. |
| 5,298,331 A | * | 3/1994 | Kanakarajan ........... B32B 27/34 428/458 |
| 6,391,999 B1 | | 5/2002 | Crivello |
| 7,790,347 B2 | | 9/2010 | Leatherdale et al. |
| 2015/0159044 A1 | | 6/2015 | Bae et al. |
| 2017/0369654 A1 | | 12/2017 | Kao et al. |

\* cited by examiner

*Primary Examiner* — Kuo Liang Peng

(57) ABSTRACT

In a first aspect, a coated film includes a polyimide film, a curable resin coating composition and an adhesion-promoter. The curable resin coating composition includes a curable oligomer and first nanoparticles. The adhesion-promoter includes a polyamic acid composition and is on a surface of the polyimide film that is in contact with the curable resin coating composition. In a second aspect, an electronic device includes the coated film of first aspect.

15 Claims, No Drawings

COATED FILMS AND ELECTRONIC DEVICES

FIELD OF DISCLOSURE

The field of this disclosure is coated films and electronic devices.

BACKGROUND OF THE DISCLOSURE

Polymer films, having polyimides, polyamide imides or polyester imides, can potentially replace rigid glass cover sheets and other substrates which are currently used in display applications, such as organic light-emitting diode (OLED) displays. For example, aromatic polyimides are typically very thermally stable, with glass transition temperatures ($T_g$) of greater than 320° C., and have excellent foldability and rollability, a critical property needed for next-generation flexible displays. However, these polymer films generally do not have the hardness or scratch resistance required for the cover sheet of a display, and thus must incorporate an outer coating layer to protect the polymer films. These outer hard coat layers are often silicon-based and often incorporate silicon oxide nanoparticles to improve hardness and scratch resistance. Such hard coat layers protect the underlying substrate from mechanical abrasion and wear, and optionally enhance the self-cleaning properties of the surface.

Many polyamide imides (PAI) are very soluble in polar, non-protic solvents, and PAI films will form a specific interface with a hard coat formulation which is likely a combination of the hard coat and PAI film components. By comparison, a hard coat formulation containing non-protic solvents interacts to a lesser degree with most polyimide films, and partly for this reason, the interface between the hard coat film and polyimide film is not well formed. Thus, there is a need to design an interface between a hard coat film and a polyimide film with improved adhesion.

SUMMARY

In a first aspect, a coated film includes a polyimide film, a curable resin coating composition and an adhesion-promoter. The curable resin coating composition includes a curable oligomer and first nanoparticles. The adhesion-promoter includes a polyamic acid composition and is on a surface of the polyimide film that is in contact with the curable resin coating composition.

In a second aspect, an electronic device includes the coated film of first aspect.

The foregoing general description and the following detailed description are exemplary and explanatory only and are not restrictive of the invention, as defined in the appended claims.

DETAILED DESCRIPTION

In a first aspect, a coated film includes a polyimide film, a curable resin coating composition and an adhesion-promoter. The curable resin coating composition includes a curable oligomer and first nanoparticles. The adhesion-promoter includes a polyamic acid composition and is on a surface of the polyimide film that is in contact with the curable resin coating composition.

In one embodiment of the first aspect, the curable oligomer is selected from the group consisting of (meth) acrylate oligomers, urethane oligomers, (meth)acrylate-urethane oligomers, siloxane oligomers, and combinations thereof.

In another embodiment of the first aspect, the curable resin coating composition further includes an organic coating solvent selected from the group consisting of 2,6-dimethylcyclohexanone, 2,4-dimethyl-3-pentanone; 2,4-dimethyl-3-pentanol, 2,2,4,4-tetramethyl-3-pentanone, 2,6-dimethyl-4-heptanone, and methyl 2-hydroxy-2-methylpropanoate, isopropyl acetate and isoamyl acetate.

In still another embodiment of the first aspect, the first nanoparticles include inorganic particles and are present in an amount of from 35 to 66 wt %, based on the total weight of the composition excluding organic solvent. In a specific embodiment, the inorganic particles include non-porous nanoparticles of silica, a metal oxide, or a mixture thereof.

In yet another embodiment of the first aspect, the adhesion-promoter further includes filler. In a specific embodiment, the filler includes second nanoparticles.

In still yet another embodiment of the first aspect, the polyimide includes a dianhydride selected from the group consisting of 3,3',4,4'-biphenyl tetracarboxylic dianhydride, pyromellitic dianhydride, cyclobutane-1,2,3,4-tetracarboxylic dianhydride (CBDA); 4,4'-(hexafluoroisopropylidene) diphthalic anhydride and mixtures thereof.

In a further embodiment of the first aspect, the polyimide includes a fluorinated dianhydride. In a specific embodiment, the fluorinated dianhydride includes 4,4'-(hexafluoroisopropylidene)diphthalic anhydride.

In still a further embodiment of the first aspect, the polyimide includes a fluorinated diamine. In a specific embodiment, the fluorinated diamine includes 2,2'-bis(trifluoromethyl) benzidine.

In a second aspect, an electronic device includes the coated film of first aspect.

In one embodiment of the second aspect, the coated film is used in device components selected from the group consisting of substrates for color filter sheets, cover sheets, and touch sensor panels. In a specific embodiment, the cover sheet further includes an anti-reflection layer.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide manufacturing processes may be used to prepare polyimide films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, less than 205, less than 200, less than 195, less than 190, or less than 180° C. is preferred.

Solvents of the present invention may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, any number of suitable diamines can be used in forming the polyimide film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine, 1,5-naphthalenediamine, 4,4'-diaminobiphenyl, 4,4"-diamino terphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene, 2,4,6-trimethyl-1,3-diaminobenzene, and linear aliphatic diamines, such as 1,2-diaminoethane 1,6-diaminohexane, 1,4-diaminobutane, and bicyclo[2.2.2]octane-1,4-diamine.

In one embodiment, a suitable diamine for forming the polyimide film can include a fluorinated diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl) fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl)benzene amine], 4,4'-thio-bis-[(2-trifluoromethyl)benzene-amine], 4,4'-thio-bis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-tri-fluoromethyldiphenyloxide, 2,2-Bis[4'(4"-aminophenoxy)phenyl] phthalein-3',5'-bis(trifluoromethyl)anilide (6FADAP) and 3,3',5,5'-tetrafluoro-4,4'-diamino-diphenylmethane (TFDAM). In a specific embodiment, the fluorinated diamine is 2,2'-bis(trifluoromethyl) benzidine (TFMB).

Dianhydrides

In one embodiment, any number of suitable dianhydrides can be used in forming the polyimide film. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride, cyclobutane-1,2,3,4-tetracarboxylic dianhydride (CBDA) (CBDA), and alicyclic dianhydrides, such as cyclohexane dianhydride, 1,2,3,4-cyclopentanetetracarboxylic dianhydride (CPDA), hexahydro-4,8-ethano-1H,3H-benzo[1,2-c:4,5-c]difuran-1,3,5,7-tetrone (BODA), and 3-(carboxymethyl)-1,2,4-cyclopentanetricarboxylic acid 1,4:2,3-dianhydride (TCA).

In one embodiment, a suitable dianhydride for forming the polyimide film can include a fluorinated dianhydride, such as 4,4'-(hexafluoroisopropylidene)diphthalic anhydride (6FDA) and 9,9-bis (trifuoropylidene)-2,3,6,7-xanthene tetracarboxylic dianhydride. In a specific embodiment, the fluorinated dianhydride is 4,4'-(hexafluoroisopropylidene)diphthalic anhydride (6FDA).

Polyimide Films

In one embodiment, a polyimide film can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.).

The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Nanoparticles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 or 40% by weight.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, fillers (e.g., inorganic or organic fillers) or various reinforcing agents. Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multiwalled and single walled carbon nanotubes and carbon nanofibers.

The solvated mixture (the polyamic acid casting solution) can then be cast or applied onto a support, such as an endless belt or rotating drum, to give a film. In one embodiment, the polyamic acid can be solution cast in the presence of an imidization catalyst. Use of an imidization catalyst can help to lower the imidization temperature and shorten the imidization time, and can also help in the formation of refractive index-matching nanoparticle aggregates that essentially maintain the volume ratio of low and high index nanoparticles in the aggregate. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to provide a polyimide film.

Useful methods for producing polyimide films containing a polyimide in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, if the polyimide is soluble in a non-protic solvent, such as DMAc or NMP, the polyimide can be formed in solution, optionally with the addition of catalysts at higher temperatures (>50° C.). After filtration, the polyimide powder can be re-dissolved in a solvent. The polyimide solution can then be cast onto a support (e.g. a moving belt or rigid support) and coalesced to create a polyimide film.

The thickness of the polymer film may be adjusted, depending on the intended purpose of the film or final application specifications. In one embodiment, the polyimide film has a total thickness in a range of from about 1 to about 150 μm, or from about 5 to about 125 μm, or from about 10 to about 75 μm, or from about 20 to 50 about μm.

Curable Resin Coating Compositions

In one embodiment, a curable resin coating composition comprises at least one curable oligomer and at least one organic coating solvent chosen from 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isopropyl acetate; and isoamyl acetate. Suitable curable oligomers are any which form a hard coat layer upon curing. As used herein, the term "hard coat" refers to a material, coating, or layer on a substrate that forms a film upon curing having a higher pencil hardness than the substrate. Such hard coat layers protect the underlying substrate from mechanical abrasion and wear, and optionally enhances the self-cleaning properties of the surface.

Suitable curable oligomers useful in a curable resin coating composition include, but are not limited to, (meth) acrylate oligomers, urethane oligomers, (meth)acrylate-urethane oligomers, siloxane oligomers, and combinations thereof. Liquid curable oligomers are preferred. Suitable (meth)acrylate oligomers include, without limitation, oligomers comprising as polymerized units one or more (meth)acrylate monomers chosen from an aliphatic monofunctional (meth)acrylate monomers and aliphatic multifunctional (meth)acrylate monomers. Exemplary (meth)acrylate-urethane oligomers and those comprising as polymerized units one or more aliphatic urethane (meth)acrylate monomers. Suitable acrylate oligomers and urethane oligomers are those having a formula molecular weight of from 1,000 to 20,000 $D_a$, preferably, from 1,500 to 10,000 $D_a$. It is preferred that the present curable oligomer is chosen from (meth)acrylate oligomers, (meth)acrylate-urethane oligomers, siloxane oligomers, and combinations thereof, more preferably from (meth)acrylate-urethane oligomers and a siloxane oligomer, even more preferably the curable oligomer is a siloxane oligomer, and yet more preferably a liquid siloxane oligomer.

Suitable siloxane oligomers are those disclosed in U.S. Published Patent Application Nos. 2015/0159044 and 2017/0369654, and in U.S. Pat. Nos. 7,790,347 and 6,391,999. In one embodiment, preferred curable oligomers comprise polymerized units of formula $R1_mR2_nSi(OR3)_{4-m-n}$, wherein: R1 is a C5-20 aliphatic group comprising an oxirane ring fused to an alicyclic ring; R2 is a C1-20 alkyl, C6-30 aryl group, or a C5-20 aliphatic group having one or more heteroatoms; R3 is a C1-4 alkyl group or C1-4 acyl group; m is 0.1 to 2.0; and n is 0 to 2.0. When the siloxane oligomer contains siloxane units which are not identical, m and n are molar average values. It is preferred that R1 contains at least 6 carbon atoms, preferably no more than 15, preferably no more than 12, preferably no more than 10. Preferably, R1 comprises an oxirane ring fused to an alicyclic ring having 5 or 6 carbon atoms, preferably six carbon atoms, and more preferably a cyclohexane ring. Preferably, R1 contains no elements other than carbon, hydrogen and oxygen. It is preferred that R1 is an epoxycyclohexyl (that is, a cyclohexene oxide) group linked to silicon by a —(CH$_2$)$_j$— group, where j is from 1 to 6, and preferably 1 to 4. Preferably, when R2 is alkyl it contains no more than 15 carbon atoms, more preferably no more than 12, and yet preferably no more than 10. When R2 is an aryl group it preferably contains no more than 25 carbon atoms, more preferably no more than 20, and yet preferably no more than 16. The term "C5-20 aliphatic group having one or more heteroatoms" refers to a C5-20 aliphatic group having one or more of: a halogen such as fluorine; an ester group such as an acrylate group, a methacrylate group, a fumarate group, or a maleate group; a urethane group; and a vinyl ether group. It is preferred that R2 is a C1-20 alkyl or C6-30 aryl group, and more preferably C1-20 alkyl. In an alternate preferred embodiment, R2 is a C1-20 alkyl or a C5-20 aliphatic group having one or more heteroatoms, and more preferably C1-20 alkyl. Preferably, when R3 is alkyl, it is methyl or ethyl, and more preferably methyl. When R3 is acyl, it is preferably formyl or acetyl. Preferably, m is at least 0.2, and more preferably at least 0.5; preferably no greater than 1.75, and more preferably no greater than 1.5. Preferably, n is no greater than 1.5, more preferably no greater than 1.0, yet preferably no greater than 0.8, and even more preferably n is zero. Suitable curable siloxane oligomers are available from Polyset Company (Mechanicville, N.Y.).

In one embodiment, curable resin coating compositions comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isopropyl acetate; isoamyl acetate; and mixtures thereof, preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; methyl 2-hydroxy-2-methylpropanoate; isoamyl acetate; and mixtures thereof, and more preferably comprise an organic coating solvent chosen from: 2,6-dimethylcyclohexanone; 2,4-dimethyl-3-pentanone; 2,4-dimethyl-3-pentanol; 2,2,4,4-tetramethyl-3-pentanone; 2,6-dimethyl-4-heptanone; and methyl 2-hydroxy-2-m ethylpropanoate; and mixtures thereof.

In one embodiment, curable resin coating compositions may comprise one or more secondary organic solvents in addition to the one or more organic coating solvents described above. The one or more secondary organic solvents are different from the one or more organic coating solvents. A wide variety of organic solvents may be used as the secondary organic solvent in the present compositions, provided that the organic coating solvent is in the majority (>50 wt % of the solvent mixture) and the secondary organic solvent is in the minority (<50 wt % of the solvent mixture). Suitable secondary organic solvents have from 3 to 10 carbon atoms, and may be aliphatic or aromatic. Preferably, the secondary organic solvent is aliphatic and more preferably a C3-10 aliphatic compound having one or more oxygen atoms. Exemplary secondary organic solvents include, but are not limited to: 1-methoxypropan-2-ol (PGME); 1-ethoxypropan-2-ol (PGEE); 1-methoxy-2-methylpropan-2-ol; methyl lactate; ethyl lactate; methyl glycolate; 1-methoxy-propan-2-one; hydroxyacetone; 1,2-dimethoxyethane; 1,2-dimethoxypropane; 1-methoxy-2-butanol; methyl 2-methoxyacetate; isopropanol; cyclopentanol; 2-methylbutan-1-ol; 4-methylpentan-2-ol; 3-methylbutan-2-ol; toluene; and mixtures thereof.

Typically, the one or more curable oligomers are present in the curable resin coating composition in an amount of from 25 to 99 wt %, based on the total weight of the composition excluding organic solvent. Preferably, the curable resin coating composition comprises a siloxane oligomer in an amount of at least 28 wt %, preferably at least 29 wt %, preferably at least 30 wt %; preferably no more than 99 wt %, and preferably no more than 65 wt %, based on the total weight of the composition excluding organic solvent. When the curable oligomer is a siloxane, it is preferred that the siloxane oligomer comprises from 25 to 80 wt %, more preferably from 30 to 70 wt %, based on the total weight of the composition excluding organic solvent. Preferably, the present curable resin coating compositions comprise from 50.1 to 100 wt % of the organic coating solvent described above and from 0 to 49.9 wt % of one or more secondary organic solvents, based on the total weight of organic solvent. When one or more secondary organic solvents are used, they are preferably present in an amount of from 1 to 49.5 wt %, preferably from 2 to 40 wt %, and more preferably from 5 to 20 wt %, based on the total weight of organic solvents.

In one embodiment, reactive modifiers may be added to the curable resin coating composition to modify the formulation for performance improvement. Such reactive modifiers include, without limitation, flexibility modifiers, hardness modifiers, viscosity modifiers, optical property modifiers, and the like. Preferably, the reactive modifiers are present in the resin composition in a total amount from 0 to 20 wt %; preferably at least 1 wt %, preferably at least 4 wt %, preferably at least 8 wt %; preferably no more than 17 wt %, and preferably no more than 15 wt %, based on the total weight of components in the composition exclusive of organic solvent. Preferably, the reactive modifier comprises at least two epoxycyclohexane groups or at least two oxetane rings, and more preferably two epoxycyclohexane groups.

In one embodiment, one or more commonly known other additives may be added to the curable resin coating composition to further modify properties of the cured coating. Such optional additives include, without limitation, adhesion-promoters, leveling agents, defoaming agents, anti-static agents, anti-blocking agents, UV absorbers, optical whitening agents, anti-fingerprint additives, scratch resistance additives, and the like. Mixtures of two or more of such optional additives may be used in the compositions. These additives may be in liquid or solid form. Typically, each additive may be used in an amount of 0 to 5 wt %, and preferably from 0.1 to 5 wt %, and more preferably from 1 to 3 wt %, based on the total weight of the composition. Scratch resistance additives may be used in an amount of from 5 wt %, preferably 3 wt %, and more preferably 1.5 wt %, based on the total weight of the composition. A suitable amount of such scratch resistance additives is from 0 to 5 wt %, preferably from 0.1 to 3 wt %, and more preferably from 0.1 to 1.5 wt %, based on the total weight of the composition. Scratch resistance additives may contain small amounts of inorganic particles.

In one embodiment, curable resin coating compositions optionally contain a curing agent, such as a photocuring agent, a thermal curing agent, or a combination thereof. Preferably, the curable resin coating composition comprises a photocuring agent, and more preferably a cationic photoinitiator. Such curing agent is present in the curable resin coating compositions in an amount of from 0 to 8 wt %, based on the total weight of the composition excluding organic solvent, and preferably from 0.5 to 7 wt %. Preferably, the curable resin coating composition comprises at least 1 wt % of the cationic photoinitiator, preferably at least 1.5 wt %; preferably no more than 6 wt %, preferably no more than 5 wt %, and preferably no more than 4.5 wt %. Preferred initiators include, e.g., diaryliodonium salts and triarylsulfonium salts. Such curing agents are well-known to those skilled in the art and are generally commercially available from a variety of sources. Optionally, a photosensitizer may be used in combination with a photocuring agent. Any suitable photosensitizer known in the art may be used. The selection of which photosensitizer and the amount thereof to be used is within the ability of those skilled in the art.

In one embodiment, nanoparticles may optionally be, and preferably are, added to the present curable resin coating compositions. Suitable nanoparticles are inorganic nanoparticles and organic nanoparticles. When inorganic particles are used in the present curable resin coating compositions, they are used in an amount of from 35 to 66 wt %, based on the total weight of the composition excluding organic solvent. Preferably, the curable resin coating composition comprises at least 40 wt % non-porous nanoparticles of silica, a metal oxide, or a mixture thereof, preferably at least 42; preferably no more than 65 wt %, preferably no more than 64 wt %, preferably no more than 63 wt %. The organic nanoparticles may be present in the curable composition in an amount ranging from 0 to 10 wt %, preferably in an amount of at least 0.1 wt %, preferably in an amount of up to 6 wt % based on the total weight of the resin composition excluding any organic solvent. Preferably, the organic nanoparticle is present in the curable resin coating composition in an amount of from 0.1 to 10 wt %, and more preferably from 0.1 to 6 wt %, based on the total weight of the composition excluding any organic solvent. Suitable inorganic nanoparticles are non-porous nanoparticles chosen from silica, metal oxide, or a mixture thereof. Preferably, the non-porous nanoparticles are silica, zirconium oxide, or a mixture thereof, and preferably silica. Preferably, the surface area of the non-porous nanoparticles is at least 50 $m^2/g$, preferably at least 60 $m^2/g$; preferably no greater than 500 $m^2/g$, preferably no greater than 400 $m^2/g$. In general, the non-porous nanoparticles of silica, a metal oxide, or a mixture thereof, the non-porous nanoparticles having an average particle diameter from 5 to 50 nm. Preferably, the average diameter of the nanoparticles is at least 10 nm, preferably at least 15 nm; preferably no greater than 40 nm, preferably no greater than 35 nm. Preferably, the non-porous nanoparticles are functionalized with substituent groups that can react with the epoxy group of epoxy-siloxane oligomer under a cationic photo curing process or thermal curing condition. Preferred substituent groups include, e.g., epoxy, acrylate, amino, vinyl ether, etc. Suitable organic nanoparticles include, without limitation, core-shell rubber (CSR) nanoparticles. The optional CSR organic nanoparticles comprise a rubber particle core and a shell layer, such CSR particles having an average diameter of from 50 to 250 nm. The shell layer of the CSR nanoparticles provides compatibility with the curable resin coating composition and has limited swellability to facilitate mixing and dispersion of the CSR nanoparticles in the curable resin coating composition. Suitable CSR nanoparticles are commercially available, such as those available under the following tradenames: Paraloid EXL 2650 A, EXL 2655, EXL2691 A, available from The Dow Chemical Company, or Kane Ace® MX series from Kaneka Corporation, such as MX 120, MX 125, MX 130, MX 136, MX 551, or METABLEN SX-006 available from Mitsubishi Rayon, or Genioperl P52 from Wacker Chemie AG.

Adhesion-Promoters

In one embodiment, an adhesion-promoter can include a polyamic acid compositions, which can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Nanoparticles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 or 40% by weight. In one embodiment, a polyamic acid composition of an adhesion-promoter can be the same or different from a polyamic acid composition for a polyimide film on which the adhesion-promoter is coated. The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, fillers (e.g., inorganic or organic fillers) or various reinforcing agents. Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multiwalled and single walled carbon nanotubes and carbon nanofibers. In one embodiment, fillers can include high aspect ratio fillers, such as fibers or needles derived from sepiolite, acicular structures, such as acicular forms of $TiO_2$, and the like. In one embodiment, fillers can include platelet structures, such as those derived from layered clays. In one embodiment, fillers can include nanoparticles, such as the inorganic nanoparticles and organic nanoparticles described above for the curable resin coating composition.

For optically transparent films, it is important that additives, such as fillers, do not degrade the optical properties of the film, such as the color, clarity and haze, thus the use of nanoparticles as fillers can be particularly advantageous. In one embodiment, nanoparticles can be less than about 100 nm in their longest dimension. In a specific embodiment, nanoparticles can be less than about 75 nm in their longest dimension. In a more specific embodiment, nanoparticles can be less than about 50 nm in their longest dimension. In one embodiment, nanoparticles can be any shape, including spherical and oblong, and are relatively uniform in size. They can be hollow, porous, or solid.

In one embodiment, nanoparticles can include inorganic oxides, such as oxides of silicon, aluminum and titanium, hollow (porous) silicon oxide, antimony oxide, zirconium oxide, indium tin oxide, antimony tin oxide, mixed titanium/tin/zirconium oxides, and binary, ternary, quaternary and higher order composite oxides of one or more cations selected from silicon, titanium, aluminum, antimony, zirconium, indium, tin, zinc, niobium and tantalum. In one embodiment, nanoparticle composites (e.g. single or multiple core/shell structures) can be used, in which one oxide encapsulates another oxide in one particle.

In one embodiment, nanoparticles can include other ceramic compounds, such as boron nitride, aluminum nitride, ternary or higher order compounds containing boron, aluminum and nitrogen, gallium nitride, silicon nitride, aluminum nitride, zinc selenide, zinc sulfide, zinc telluride, silicon carbide, and their combinations, or higher order compounds containing multiple cations and multiple anions.

Coated Films

Curable resin coating compositions can be disposed on a surface of a flexible substrate, such as a polyimide film, by any suitable means known in the art to form a coating of the curable resin coating composition on the polyimide substrate. An adhesion-promoter, such as a polyamic acid composition, is present on a surface of the flexible substrate to which the curable resin coating composition is disposed and improves the adhesion between the curable resin coating composition and the polyimide film. In one embodiment, the adhesion-promoter can have a thickness in a range of from 0.1 to 10 μm after partial solvent evaporation. In one embodiment, the adhesion-promoter can have a thickness, after partial solvent evaporation, that is less than 50% of the thickness of the curable resin coating after curing. In one embodiment, the adhesion-promoter can have a thickness, after partial solvent evaporation, that is less than 25% of the thickness of the curable resin coating after curing.

In one embodiment, curable resin coating formulations can be prepared by first combining the desired amount of resin with the desired amount of nanoparticle suspension in a 20-ml scintillation vial, followed by sonication (Fisher Scientific bath sonicator) and vortex mixing at room temperature until a homogenous mixture is obtained. When a nanoparticle suspension is used, it is used as received or the suspension is concentrated under vacuum at room temperature until ca. 95% of the solvent had been removed as judged by loss in sample weight. New solvent is then added as specified, and the mixture homogenized under sonication and vortex mixing. Lastly, the desired amount of photoacid generator (PAG) is added into the solution. The final formulation is left on a rotary mixer for at least 12 hours at room temperature to ensure homogenous mixing before film casting.

Suitable methods for coating the curable resin coating composition include, but are not limited to, spin-coating, curtain coating, spray coating, roller coating, doctor blading, bar coating, dip coating, slot die coating, and vapor deposition, among other methods. After casting, the coating is baked to remove the organic coating solvent and any optional secondary organic solvent. The selection of such baking conditions is within the ability of those skilled in the art. Next, the coating is cured, such as by heating or by exposure to actinic radiation (photocuring), and preferably by exposure to UV radiation, to form a hard coat film on the surface of the flexible substrate. In one embodiment, drawdown bars (manually or machine-operated) with different gap sizes are used to control film thickness of the hard coating when casting the prepared formulations on transparent polyimide (PI) substrates. The cast films is immediately heated to 90° C. on a hot-plate for three minutes in a fume hood, followed by UV-curing (Fusion D-type bulb, four passes at a belt speed of 47 fpm). The average values for UV irradiance are around 3670, 960, 280, 4360 mW/cm$^2$ in the UVA, UVB, UVC, and UVV regimes, respectively. The average values for energy density were ca. 480, 120, 40, and 570 mJ/cm$^2$ in the UVA, UVB, UVC, and UVV regimes, respectively. Finally, the films are thermally cured for 2 hours at 87° C. in an oven after UV-cure. In one embodiment, after curing, the adhesion-promoter at the interface between the hard coat film and the polyimide film can be partially or substantially intermixed with the hard coat film.

Applications

In one embodiment, a coated film can be used in electronic device applications, such as in an organic electronic device. Organic electronic devices that may benefit from having a coated film include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode).

In one embodiment, a coated film can act as a flexible replacement for glass in an electronic device, such as an organic electronic device, to form a flexible display device. Layers that may or may not be present in organic electronic devices include color filters, touch sensor panels, and/or cover sheets (also known as cover lenses or cover films). One or more of these layers, in addition to the substrates used within these layers or other parts of the device, may be made from polyimide films that may benefit from being coated with a curable resin composition. In one embodiment, a hard coat (curable resin composition) is used to protect a polyimide film during processing to form a touch sensor panel device. In a specific embodiment, a coated film can be used in a cover sheet for and electronic device. In one embodiment, a cover sheet (cover lens or cover window) also includes an anti-reflection layer.

The advantageous properties of this invention can be observed by reference to the following examples that illustrate, but do not limit, the invention. All parts and percentages are by weight unless otherwise indicated.

EXAMPLES

Test Methods

Crosshatch Adhesion

For crosshatch adhesion, a cross-cut test method is used for determining the resistance of coatings to separation from substrates. A tool to cut a right-angle lattice pattern into a coating is utilized, penetrating all the way to the substrate. A quick pass/fail test can be accomplished through this method. When testing a multi-coat system, determination of the resistance to separation of different layers from one another can be accomplished.

A crosshatch pattern is made through the film to the substrate. Detached flakes of coating are removed by brushing with a soft brush. Pressure-sensitive tape is then applied over the crosshatch cut. The tape is smoothed into place using a pencil eraser over the area of the incisions and then is removed by pulling it off rapidly back over itself as close to an angle of 180° as possible. ASTM D3359 is used for rating adhesion. The amount of coating removed is calculated based on the total area of the coating covered by the tape.

Micro-Scratch

A Scratch Tester (Anton Paar USA Inc., Ashland, Va.) equipped with a 100 μm radius Tungsten carbide (WC) indenter was used to make micro-scratches in coated films. A 5 mm long progressive load scratch was performed with linear ramping from 0.03 to 5 N at a speed of 1 mm/min.

The force (N) at first fracture is the force at which an initial scratch is observed during the micro-scratch measurement. The force (N) at failure is the force where compete failure is observed, i.e., the full thickness of the coating layer is removed by the WC tip. The distance is defined at the length (in mm) between the first fracture observation and the complete coating failure.

Thickness

Coating thickness was determined by measuring coated and uncoated samples in 5 positions across the profile of the film using a contact-type FISCHERSCOPE MMS PC2 modular measurement system thickness gauge (Fisher Technology Inc., Windsor, Conn.).

Example 1

For the polyamic acid solution (PAA) of Example 1 (E1), into a nitrogen purged 80-gallon reactor, 17500 g of trifluoromethylbenzidine (TFMB, Seika Corp., Wakayam Seika Kogyo Co., LTD., Japan) and 136830 g of dimethyl acetamide (DMAc) and were stirred and agitated. 9406 g of Biphenyl tetracarboxylic acid dianhydride (BPDA, Mitsubishi Chemical Co., Japan) and 9468 g of 4,4'-(hexafluoroisopropylidene)diphthalic anhydride (6FDA, Synasia Inc., Metuchen, N.J.) were added in four separate aliquots over a 6 hour period. The reaction mixture was maintained at ~40° C. during this procedure. Three additional aliquots of 15.520 g of BPDA and 15.622 g of 6FDA were added to the reaction mixture over a period of ~3 hours. The viscosity of the pre-polymer was ~100 poise.

A portion of the polymer was polymerized ("finished") to ~1700 poise using a mixture of 6 wt % pyromellitic dianhydride in DMAc in a nitrogen purged reactor. The material was polymerized with the PMDA solution over the course of ~24 hours at 40° C., forming a 21 wt % solids polyamic acid solution. The monomer composition of the polyamic acid solution was BPDA 0.6/6FDA 0.4/TFMB 1.0 (molar equivalents).

A film was cast onto a stainless-steel belt and was dried at an oven temperature in the range of from about 95 to about 150° C. The self-supporting film was peeled from the belt and heated with radiant heaters in a tenter oven at a temperature of from about 110 to about 670° C. (radiant heater surface temperature) to completely dry and imidize the polymers, forming a polyimide film with a dry thickness of ~50 μm (2 mil).

For the adhesion-promoter, the 21 wt % solids solution of polyamic acid (monomer composition BPDA 0.6/6FDA 0.4/TFMB 1.0) in DMAc was diluted with additional DMAc to 17 wt % and was applied to the 2 mil polyimide film to form a polyamic acid coating layer of ~4 μm, after partial solvent evaporation. The thin polyamic acid layer was cast using a stainless-steel drawdown bar. The drawdown bar with a 1 mil gap was used to coat the polyamic acid and create the ~4 μm adhesion-promoter, after drying at 80° C. for 20 minutes.

Example 2

For Example 2 (E2), the same procedure as described in E1 was used, but the coating was cast using a drawdown bar with a 2 mil gap instead of 1 mil. After drying at 80° C. for 20 minutes the average thickness of the adhesion-promoter was measured at 5 μm.

Example 3

For Example 3 (E3), the same procedure as described in E1 was used, but the coating was cast as a 21 wt % solution instead of diluting to 17 wt % and using a drawdown bar with a 2 mil gap instead of 1 mil. After drying at 80° C. for 20 minutes the average thickness of the adhesion-promoter was measured at 15 μm.

The polyimide films with adhesion-promoters of E1-E3 were further coated with curable resin coating compositions to form the coated films of the following examples.

Example 4

For Example 4 (E4), the polyimide film with adhesion-promoter of E1 (4 μm polyamic acid coating) was used. A curable resin coating composition containing 50 wt % of an epoxy siloxane oligomer (PC-2003, Polyset Co. Inc., Mechanicville, N.Y.) was mixed with 50 wt % of a nanoparticle solution (70 wt %~25 nm solid spherical $SiO_2$ nanoparticles and 30 wt % propylene glycol methyl ether (PGME), ADMAFUSE® Silica, Admatechs Co. Ltd., Japan). The solution was mixed with a 9:1 ratio of co-solvent 2,4-dichlorophenoxypropionic acid (2,4DP) and PGME, and sonicated repeatedly to ensure homogeneous mixing. After sonication, 0.15 g of triarylsulfonium hexafluoroantimonate salts was added into the solution and mixed using a Vortex Mixer. The curable resin was coated using a bar coater and cured under 850 mJ/cm² UVA and 240 mJ/cm² UVB, then prebaked at 90° C. for 3 minutes, followed by thermal curing at 150° C. for 3 minutes to form a 30 μm dry coating.

Crosshatch adhesion measurements showed good adhesion for this sample. The amount of coating removed was only 5%.

Comparative Example 1

For Comparative Example 1 (CE1), the same procedure as describe in E4 was used, except that the polyimide film did not include an adhesion-promoter. Crosshatch adhesion was poor. The amount of coating removed was 100%.

Example 5

For Example 5 (E5), the same procedure as describe in E4 was used, except that the polyimide film used the adhesion-promoter of E2 (5 μm polyamic acid coating) and the curable resin formed a 20 μm coating. Crosshatch adhesion was good. The amount of coating removed was 10%.

Comparative Example 2

For Comparative Example 2 (CE2), the same procedure as describe in E4 was used, except that the polyimide film used the adhesion-promoter of E3 (15 μm polyamic acid coating) and the curable resin formed a 28 μm coating. Crosshatch adhesion was fair. The amount of coating removed was 40%.

Example 6

For Example 6 (E6), the polyimide film of E1 was coated with an adhesion-promoter using a board coating technique. The polyimide film of E1 was coated with a 2.5 wt % PAA/DMAc/methyl ethyl ketone (MEK) solution using a 1.5 mil board coating knife at 41 feet per minute. The film was dried in air, then oven dried at 150° C. for 60 minutes. The thickness of the adhesion-promoter layer was 0.8 μm.

A curable resin composition, as described in E4, was used to form a coated film on the polyimide film with adhesion-promoter using a 3 mil board coating knife at 41 feet per minute, then soft baked at 90° C. for 3 minutes. The coated film was then UV cured 3 times at 30 fpm, 30 fpm, and 10 fpm, respectively, using a F300 UV lamp system (Fusion UV Systems, Inc., Gaithersburg, Md.). After UV curing, the films were thermally annealed at 150° C. for 3 minutes. The dry-coating thickness was 15 μm. Crosshatch adhesion was good. The amount of coating removed was 0%.

Comparative Example 3

For Comparative Example 3 (CE3), the same procedure as describe in E6 was used, except that the polyimide film did not include an adhesion-promoter. Crosshatch adhesion was poor. The amount of coating removed was 100%.

Crosshatch adhesion and micro-scratch testing results are summarized in Table 1. Examples E4-E6 all show excellent adhesion, with less than 30% of the coating removed in the crosshatch adhesion test. In addition, they all showed good micro-scratch resistance, with first fractures of greater than 1.5 N and forces at failure of greater than 3.0 N.

TABLE 1

| Example | Coating Process | Adhesion-Promoter (μm) | Curable Resin (μm) | Coating Removed (%) | First Fracture (N) | Failure (N) | Scratch Distance (mm) |
|---|---|---|---|---|---|---|---|
| E4 | Bar | 4 | 30 | 5 | 2.02 | 3.07 | 3.0 |
| CE1 | Bar | — | 30 | 100 | 1.93 | 2.39 | 2.2 |
| E5 | Bar | 5 | 20 | 10 | 1.68 | 3.25 | 3.3 |
| CE2 | Bar | 15 | 28 | 40 | 1.37 | 2.31 | 2.5 |
| E6 | Board | 0.8 | 15 | 0 | 1.57 | 3.52 | 3.5 |
| CE3 | Board | — | 15 | 100 | — | — | — |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose. Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:
1. A coated film comprising:
a polyimide film;

a curable resin coating composition comprising a curable oligomer and first nanoparticles; and an adhesion-promoter comprising a polyamic acid composition, wherein the adhesion-promoter is on a surface of the polyimide film that is in contact with the curable resin coating composition.

2. The coated film of claim 1, wherein the curable oligomer is selected from the group consisting of (meth)acrylate oligomers, urethane oligomers, (meth)acrylate-urethane oligomers, siloxane oligomers, and combinations thereof.

3. The coated film of claim 1, wherein the curable resin coating composition further comprises an organic coating solvent selected from the group consisting of 2,6-dimethyl-cyclohexanone, 2,4-dimethyl-3-pentanone; 2,4-dimethyl-3-pentanol, 2,2,4,4-tetramethyl-3-pentanone, 2,6-dimethyl-4-heptanone, and methyl 2-hydroxy-2-methylpropanoate, isopropyl acetate and isoamyl acetate.

4. The coated film of claim 1, wherein the first nanoparticles comprise inorganic particles and are present in an amount of from 35 to 66 wt %, based on the total weight of the composition excluding organic solvent.

5. The coated film of claim 4, wherein the inorganic particles comprise non-porous nanoparticles of silica, a metal oxide, or a mixture thereof.

6. The coated film of claim 1, wherein the adhesion-promoter further comprises filler.

7. The coated film of claim 6, wherein the filler comprises second nanoparticles.

8. The coated film of claim 1, wherein the polyimide comprises a dianhydride selected from the group consisting of 3,3',4,4'-biphenyl tetracarboxylic dianhydride, pyromellitic dianhydride, cyclobutane-1,2,3,4-tetracarboxylic dianhydride (CBDA); 4,4'-(hexafluoroisopropylidene)diphthalic anhydride and mixtures thereof.

9. The coated film of claim 1, wherein the polyimide comprises a fluorinated dianhydride.

10. The coated film of claim 9, wherein the fluorinated dianhydride comprises 4,4'-(hexafluoroisopropylidene) diphthalic anhydride.

11. The coated film of claim 1, wherein the polyimide comprises a fluorinated diamine.

12. The coated film of claim 11, wherein the fluorinated diamine comprises 2,2'-bis(trifluoromethyl) benzidine.

13. An electronic device comprising the coated film of claim 1.

14. The electronic device of claim 13, wherein the coated film is used in device components selected from the group consisting of substrates for color filter sheets, cover sheets, and touch sensor panels.

15. The electronic device of claim 14, wherein the cover sheet further comprises an anti-reflection layer.

* * * * *